United States Patent
Corghi (10) Patent No.: US 11,676,304 B2
(45) Date of Patent: Jun. 13, 2023

(54) APPARATUS FOR CALIBRATING AN ADAS SENSOR OF AN ADVANCED DRIVER ASSISTANCE SYSTEM OF A VEHICLE

(71) Applicant: NEXION S.p.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 573 days.

(21) Appl. No.: 16/799,260

(22) Filed: Feb. 24, 2020

(65) Prior Publication Data

US 2020/0273206 A1 Aug. 27, 2020

(30) Foreign Application Priority Data

Feb. 21, 2020 (EP) ................................. 20158828

(51) Int. Cl.
| | |
|---|---|
| *G06T 7/80* | (2017.01) |
| *G01S 7/40* | (2006.01) |
| *G01S 7/497* | (2006.01) |
| *G01S 7/52* | (2006.01) |
| G01S 13/931 | (2020.01) |

(52) U.S. Cl.
CPC .................. *G06T 7/80* (2017.01); *G01S 7/40* (2013.01); *G01S 7/4972* (2013.01); *G01S 7/52004* (2013.01)

(58) Field of Classification Search
USPC .......... 73/1.01, 1.45, 1.56; 348/61, 118, 120
See application file for complete search history.

(56) References Cited

U.S. PATENT DOCUMENTS

| | | | |
|---|---|---|---|
| 10,458,782 B2 | 10/2019 | Lee et al. | |
| 11,391,826 B2 * | 7/2022 | Singh | G01S 17/931 |
| 11,403,891 B2 * | 8/2022 | Nee | G01S 7/4095 |
| 2005/0096807 A1 * | 5/2005 | Murray | G01B 11/2755 |
| | | | 33/288 |
| 2017/0343654 A1 * | 11/2017 | Valois | G01S 17/931 |

FOREIGN PATENT DOCUMENTS

| | | |
|---|---|---|
| WO | 2014/053485 A1 | 4/2014 |
| WO | 2018/067354 A1 | 4/2018 |
| WO | 2018/153723 A1 | 8/2018 |
| WO | 2018/154328 A1 | 8/2018 |

OTHER PUBLICATIONS

Italy Search Report dated Nov. 6, 2019 for Application No. 102019000002703.

* cited by examiner

*Primary Examiner* — Daquan Zhao
(74) *Attorney, Agent, or Firm* — The Dobrusin Law Firm, P.C.

(57) ABSTRACT

An apparatus (1) for calibrating an ADAS sensor of an advanced driver assistance system of a vehicle (9), comprises: a base unit (2); a support structure (3) connected to the base unit (2); a vehicle calibration assistance structure (4), including a first surface which has a first combination of predetermined graphical features and which can be associated with the support structure so that the first surface, at an operating position, faces towards the service area (8); a flexible panel roller assembly connected to the support structure and including a roller and a flexible target panel (40).

20 Claims, 7 Drawing Sheets

APPARATUS FOR CALIBRATING AN ADAS SENSOR OF AN ADVANCED DRIVER ASSISTANCE SYSTEM OF A VEHICLE

This invention relates to an apparatus and a method for calibrating an ADAS sensor of an advanced driver assistance system sensor of a vehicle. In particular, by vehicle is meant a motor car, a lorry, a truck or other wheeled vehicle.

In particular, the field of this application is the calibration or alignment of the vehicle's sensors such as optical sensors (cameras), radar sensors, LIDAR sensors or other sensors used in safety systems to prevent frontal collisions, in cruising speed control systems, in lane departure warning systems or in road sign recognition systems.

In this field, it is common practice to use structures comprising a target panel bearing a graphical feature, placed in front of the vehicle and imaged by the vehicle sensor to be calibrated or aligned. For example, a system for aligning a vehicle sensor is described in patent document WO2018/067354A1. This system includes a support structure supporting a target panel used to align or recalibrate the vehicle's safety sensors; The target panel bears a graphical feature which the vehicle sensor "sees" during the aligning or calibrating procedure; this graphical feature is typical not only of the type of sensor to be calibrated or aligned but also of the vehicle make or model. Thus, this system requires that workshops responsible for adjusting the vehicle sensors be equipped with a large number of target panels and, each time the operator needs to adjust the sensors, the target panel suitable for the specific vehicle must be selected and mounted on the support structure. It is evident that using a system of this kind is onerous not only because it is time-consuming but also because it requires a certain amount of workshop space to store all the different target panels and is not really practical.

Patent document WO2018/153723A1 provides a calibration assistance system for vehicle sensors; the system comprises a screen on which an image that provides the graphical feature to be imaged by the vehicle sensor is displayed. This system is very expensive and not really accessible to small and medium sized businesses. Moreover, the screen is extremely cumbersome and occupies a lot of space even when it is not being used.

This disclosure has for an aim to provide a system for calibrating (and/or adjusting and/or aligning) a sensor (or more generally, a camera) of a vehicle and a method for calibrating (and/or adjusting and/or aligning) a sensor (or more generally, a camera) of a vehicle in order to overcome the above mentioned drawbacks of the prior art.

This aim is fully achieved by the apparatus and method of this disclosure as characterized in the appended claims.

According to one aspect it, this disclosure relates to an apparatus for calibrating an ADAS sensor (at least one) of a vehicle. By ADAS sensor is meant a sensor forming part of an advanced driver assistance system of a vehicle.

In an embodiment, the sensor to be aligned or recalibrated is a camera. In an embodiment, the sensor to be aligned or recalibrated is a radar sensor.

In an embodiment, the sensor to be aligned or recalibrated is an ultrasonic sensor. In an embodiment, the sensor to be aligned or recalibrated is a LIDAR sensor.

The apparatus comprises a base unit. In an embodiment, the base unit is movable.

In an embodiment, the base unit includes a plurality of wheels rotating about respective axes of rotation. In an embodiment, at least one wheel of the plurality of wheels can swivel about a respective swivel axis. The swivel axis of each wheel is at right angles (or substantially at right angles) to the respective axis of rotation.

The apparatus comprises a support structure. The support structure is connected to (or integral with) the base unit.

The apparatus comprises a vehicle calibration assistance structure. The vehicle calibration assistance structure can be associated with the support structure.

In an embodiment, the vehicle calibration assistance structure is removably mounted on the support structure.

The vehicle calibration assistance structure includes a first surface. The first surface of the target panel has a (first) combination of predetermined graphical features.

The apparatus (or the vehicle calibration assistance structure) comprises a flexible panel roller assembly.

The flexible panel roller assembly is operatively connected (or connectable) to the support structure. The flexible panel roller assembly includes a roller. In particular, the roller of the flexible panel roller assembly is operatively connected (or connectable) to the support structure. The flexible panel roller assembly includes a flexible target panel. The flexible target panel defines the first surface.

In an embodiment, the flexible target panel (or a surface thereof) has the combination of predetermined graphical features depicted thereof.

In an embodiment, the flexible target panel includes (or is formed by) a flexible (or foldable) screen. The flexible screen is configured to display a plurality of combinations of graphical features; it is provided to select, based on the ADAS sensor to be calibrated and/or on the vehicle type, which combination of graphical feature to display on the flexible target screen. The flexible screen may be, for example, an apparatus according to one or more of the aspects described in patent document U.S. Pat. No. 10,458,782B2, whose content is recalled therein for reference.

The flexible target panel is movable from a rolled-up configuration, in which it is wound round the roller, to an unrolled configuration, in which it is at least partly unwound from the roller to dispose the first surface at an operating position. At the operating position, the first surface faces towards the service area.

Thus, when the flexible target panel is not being used (for example, because other operations are being carried out on the vehicle), it can be wound round the roller and can then be unwound at any time when the ADAS sensor needs to be calibrated.

Therefore, the solution which is object of the present disclosure provides at least the following advantages: the panel can be easily and rapidly mounted and dismounted from the support structure; moreover, the positioning of the panel is precisely repeatable, so that the calibration of the ADAS sensors can be carried out correctly and reliably.

In an embodiment, the flexible panel roller assembly also comprises a casing which surrounds the roller and the flexible target panel, too, when the latter is in the rolled-up configuration. The casing internally defines a space for accommodating the flexible target panel in the rolled-up configuration.

In an embodiment, the apparatus comprises an elastic device. In an embodiment, the elastic device comprises at least one spring. The elastic device is configured to apply an elastic force on the flexible target panel.

The elastic device (applying the elastic force) is configured to keep the flexible target panel in the rolled-up configuration until a counteracting force causes it to be spread out in the unrolled configuration; in an embodiment, the counteracting force is applied by an operator.

In an embodiment, the calibration assistance structure includes a locking device configured to keep the flexible target panel in the unrolled configuration. In an embodiment, the locking device includes one or more hooks, integral with the support structure or the calibration assistance structure and configured to stop the free end of the flexible target panel by engaging one or more slots made in the free end of the flexible target panel. In an embodiment, the locking device includes one or more slots made in the support structure or the calibration assistance structure and configured to engage one or more hooks on the free end of the flexible target panel. In an embodiment, the locking device includes lateral boards and/or a locking board, as described below in this disclosure.

Thus, in an embodiment, the locking device opposes the elastic force of the elastic device and keeps the target panel in the unrolled configuration.

The elastic device is configured to cause the flexible target panel to return to the rolled-up configuration when the locking device is disengaged.

In an embodiment, the apparatus comprises a plurality of flexible panel roller assemblies; that is to say, the apparatus can be connected to (or associated with) a plurality of flexible panel roller assemblies. Each flexible panel roller assembly of the plurality of flexible panel roller assemblies includes a respective roller and a respective flexible target panel, movable between the unrolled configuration and the rolled-up configuration. Represented on the flexible target panel of each flexible panel roller assembly is a respective first combination of predetermined graphical features. By "combination of graphical features" is meant a geometric pattern used in the procedures for calibrating the ADAS sensors (for example, cameras). Each first combination of predetermined graphical features represented on a respective target panel of a respective flexible panel roller assembly of the plurality is configured to facilitate calibration of an ADAS sensor of a certain type on a vehicle of a certain type (make and model).

In an embodiment, the flexible panel roller assemblies of the plurality of flexible panel roller assemblies are removably connectable to the support structure. In an embodiment, the flexible panel roller assemblies of the plurality of flexible panel roller assemblies are interchangeably connectable to the support structure, one in place of another.

Thus, in an embodiment, the workshop is provided with a plurality of flexible panel roller assemblies, each configured to calibrate a certain type of ADAS sensor of a certain type of vehicle. The interchangeability of the flexible panel roller assemblies on the same support structure, combined with the fact that the flexible target panels are movable between the rolled-up configuration and the unrolled configuration, facilitates the preliminaries to calibrating the ADAS sensors and also allows optimizing workshop space; in effect, when an ADAS sensor of a vehicle needs to be calibrated, a specific target panel must be selected, as specified by the manufacturer, and that particular target panel must be set in position in front of the vehicle. The fact that a panel that is no longer needed can be removed and replaced with the one suitable for the sensor and vehicle in the service area makes the operation easier and more straightforward, since the mechanic does not have to handle large-sized, flat panels.

In an embodiment, the vehicle calibration assistance structure includes a quick release connecting system. The quick release connecting system is configured to receive (hook onto) a flexible panel roller assembly of the plurality of flexible panel roller assemblies in an active position, where it is movable between the rolled-up configuration and the unrolled configuration. Thus, in the active position, the flexible panel roller assembly is connected to the quick release connecting system in such a way that it can move between the rolled-up configuration and the unrolled configuration.

The flexible panel roller assembly comprises a frame (or casing). The frame of the flexible panel roller assembly supports the roller in rotation; that is to say, the roller is rotatably coupled to the frame. Preferably, a spring or other return element is connected between the roller and the frame. The flexible panel roller assembly (specifically, the frame of the flexible panel roller assembly) includes (defines) a connecting zone, configured to act in conjunction with the quick release connecting system of the vehicle calibration assistance structure, to connect the flexible panel roller assembly (the frame of the flexible panel roller assembly) to the structure fixedly and rigidly but also releasably. For example, the connecting zone might include a first and a second connecting portion, positioned at opposite ends of the frame, relative to a longitudinal direction (the roller being connected to the frame to rotate about a longitudinal axis).

In an embodiment, the quick release connecting system comprises one or more hooks configured to lock and support the roller of the flexible panel roller assembly.

In an embodiment, the quick release connecting system comprises one or more cavities configured to receive corresponding hooks of the roller of the flexible panel roller assembly.

In an embodiment, the quick release connecting system comprises a pair of magnets which are connectable to opposite ends of the roller of the flexible panel roller assembly.

The quick release connecting system allows one flexible panel roller assembly to be replaced with another more quickly.

In an embodiment, the flexible panel roller assembly of the plurality of flexible panel roller assemblies are the same in size (that is to say, they are standard sized). This feature facilitates the interchangeability of the flexible panel roller assemblies.

In an embodiment, the size of the flexible panel roller assembly of the plurality of flexible panel roller assemblies is selected from a plurality of standard sizes. In an embodiment, the quick release connecting system is operable in a plurality of configurations to connect corresponding flexible panel roller assemblies having the plurality of standard sizes.

In an embodiment, the apparatus comprises a container. In an embodiment, the container is spaced from the support structure. In an embodiment, the container is connected to the support structure. The container includes a plurality of housings. Each housing of the plurality is configured to accommodate a corresponding flexible panel roller assembly of the plurality of flexible panel roller assemblies in a deactivated position where the flexible target panel is securely rolled up on the roller. In an embodiment, each housing has the shape of an elongate cavity into which a flexible panel roller assembly with the flexible target panel wound onto it is inserted. In an embodiment, the cavity itself keeps the flexible panel roller assembly in the deactivated position with the flexible target panel wound onto it.

Each flexible panel roller assembly (hence each cavity of the container) may have a circular, hexagonal, octagonal, rectangular or square cross section. In an embodiment, the cross section of the flexible panel roller assembly is defined by the casing. In an embodiment, the cross section of the flexible target panel in the rolled-up configuration.

In an embodiment, each flexible panel roller assembly is provided with a distinctive mark at an end of it which is visible when the flexible panel roller assembly is in the deactivated position.

In an embodiment, the distinctive mark is represented on the target panel in addition to the combination of predetermined graphical features; for example, the distinctive mark may be represented on a peripheral zone of the flexible target panel, next to the combination of predetermined graphical features.

In an embodiment, the distinctive mark is represented on the roller; for example, the distinctive mark may be represented on one end of the roller.

The distinctive mark represents the type of ADAS sensor and/or the type of vehicle including the ADAS sensor for the calibration of which the flexible panel roller assembly is configured. In an embodiment, the distinctive mark is defined by a colour. In an embodiment, the distinctive mark is defined by a number. In an embodiment, the distinctive mark is defined by an alphanumeric code.

In an embodiment, the container includes a key to the colours, numbers or alphanumeric codes to associate each colour, number or alphanumeric code with a certain ADAS sensor of a certain type of vehicle.

In an embodiment, the flexible target panel includes a layer of opaque material defining the first surface. By opaque material is meant a material which is impervious to light In an embodiment, the layer of opaque material is also retroreflective. In an embodiment, the flexible target panel includes a semi-rigid layer (which may, if necessary, coincide with the layer of opaque material) to prevent the flexible target panel from fluttering when it is in the unrolled configuration.

In an embodiment, the flexible target panel includes a metallic layer (which may, if necessary, coincide with the layer of opaque material). In an embodiment, the vehicle calibration assistance structure includes at least one magnetic cover sheet (including a magnet). The magnetic cover sheet is configured to be placed at an active position where it is magnetically held against the metallic layer of the flexible target panel and is superposed on the first surface of the flexible target panel, when the flexible target panel is in the unrolled configuration, so as to cover a portion of the first combination of predetermined graphical features. In an embodiment, the magnetic cover sheet has a uniform background (for example, white). In an embodiment, the magnetic cover sheet in turn has a surface which has a respective combination of predetermined graphical features. That way, a portion of the first combination of graphical features can be covered to adapt the target panel to a plurality of different sensors and/or vehicles.

In an embodiment, the flexible target panel defines a second surface, opposite to the first surface, having a second combination of predetermined graphical features. The second combination of predetermined graphical features is different from the first combination of predetermined graphical features. Thus, in an embodiment, the flexible target panel has a first combination of predetermined graphical features (or pattern) on a first face or side of it and a second combination of predetermined graphical features (or pattern) on the second face or side of it, and it is therefore "two-sided". A "two-sided" panel is useful for calibrating two sensors of different kinds: a first sensor with the first side and a second sensor with the second side.

In an embodiment, the flexible panel roller assembly is connectable to the support structure so that when the second surface is at a respective operating position, it faces towards the service area. Thus, in an embodiment, the quick release connecting system is configured to connect the flexible panel roller assembly at a first active position and at a second active position. At the first active position, the flexible target panel is movable between the rolled-up configuration and a first unrolled configuration, where the first surface faces towards the service area. At the second active position, the flexible target panel is movable between the rolled-up configuration and a second unrolled configuration, where the second surface faces towards the service area.

In an embodiment, the vehicle calibration assistance structure includes a back panel. The back panel is preferably rigid. The back panel is preferably connected to the support structure. Preferably, the back panel has a back surface which faces towards the service area. The back surface is configured to supportably receive the flexible target panel in the unrolled configuration. Thus, the back surface serves to improve the positioning of the flexible target panel, preventing it from fluttering.

In an embodiment, the back panel includes a pair of lateral guides projected forward, towards the service area, relative to the back surface. The lateral guides may be defined by grooves. The lateral guides extend lengthwise in parallel with each other on opposite sides of the back surface. In an embodiment, the lateral guides extend in a horizontal direction. In an embodiment, the lateral guides extend in a vertical direction. Preferably, the lateral guides extend lengthwise in parallel with an unrolling (or rolling) direction of the target panel. In the unrolled configuration, the flexible target panel is positioned between the lateral guides of the pair of lateral guides. Thus, the lateral guides internally define a cavity which accommodates the flexible target panel in the unrolled configuration.

The lateral guides further improve the positioning precision of the flexible target panel.

In an embodiment, the back panel includes a pair of lateral boards. The lateral boards are positioned on opposite sides of the back surface (in addition or alternatively to the guides).

The lateral boards are movable (rotatable) between an open position and a closed position. At the open position, the lateral boards make an angle of at least 90° with the back surface to allow the flexible target panel in the unrolled configuration to be positioned between them. In an embodiment, the lateral boards at the open position also act as lateral guides while the target panel is being unrolled. At the closed position, the lateral boards are parallel to, and superposed on, the back surface so as to hold the flexible target panel in place in the unrolled configuration. It should be noted that when they are at the closed position, the lateral boards cover the edges of the flexible target panel, leaving uncovered the first (or the second) combination of graphical features.

In an embodiment, the back panel includes a locking board, positioned along one side of the back panel opposite to the roller of the flexible panel roller assembly. The locking board is movable (rotatable) between an open position and a closed position. At the open position, the locking board is lifted off the back surface; at the closed position, the locking board is superposed on the back surface to cover a margin of the flexible target panel and hold it in place.

In an embodiment, the lateral boards and/or the locking board positioned along the side of the back panel opposite to the roller of the flexible panel roller assembly are opened and closed manually. In an embodiment, the vehicle calibration assistance structure (or the apparatus) includes one or more actuators configured to move the lateral boards and/or the locking board between the open configuration and the closed configuration.

In an embodiment, the surface of the back panel is metallic. In an embodiment, the at least one magnetic cover sheet is configured to be placed at an active position where it is magnetically held against the back panel and is superposed on the first (or second) surface of the flexible target panel, when the flexible target panel is in the unrolled configuration, so as to cover a portion of the first combination of predetermined graphical features. The magnetic cover sheet (or sheets) allows covering a part of the first (or second) combination of graphical features to adapt the target panel so it defines a further combination of graphical features to calibrate different sensors of different vehicles.

In an embodiment, the flexible target panel is movable from the rolled-up configuration to the unrolled configuration, and vice versa, along a vertical unrolling direction parallel to the weight force. In an embodiment, the unrolling direction is from the top down. In an embodiment, the unrolling direction is from the bottom up.

In an embodiment, the flexible target panel is movable from the rolled-up configuration to the unrolled configuration, and vice versa, along a horizontal unrolling direction at right angles to the weight force.

In an embodiment, the flexible panel roller assembly includes a recognition tag. In an embodiment, the recognition tag is a Radio Frequency IDentification (RFID) tag. In an embodiment, the recognition tag is a QR code. In an embodiment, the recognition tag is a bar code.

The recognition tag may be placed on the roller or on the flexible target panel.

In an embodiment, the apparatus also comprises a reader, configured to read the recognition tag. In an embodiment, the reader is integrated in the support structure.

In an embodiment, the apparatus also comprises a computer. The computer is connected to the reader to receive from the reader a signal representing the recognition tag read. The computer has access to a memory (or database). In an embodiment, the memory forms part of the apparatus. In an embodiment, the memory is remote.

In an embodiment, the computer is programmed to retrieve from the memory a reference signal, representing a reference tag. The reference tag relates to a correct panel and/or a correct position of the panel.

In an embodiment, the computer is configured to receive an input signal representing the type of vehicle located in the service area and/or the type of ADAS sensor to be calibrated, and to query the memory to retrieve the reference signal as a function of the input signal received.

In an embodiment, the apparatus comprises an interface. In an embodiment, the interface includes a touch screen. In an embodiment, the interface is configured to show the user a request for data relating to a plurality of predetermined options for the type of ADAS sensor to be calibrated. In an embodiment, the interface is configured to receive from the user a preference relating to the type of ADAS sensor to be calibrated.

In an embodiment, the interface is configured to show the user a request for data relating to a plurality of predetermined options for the type of vehicle located in the service area. In an embodiment, the interface is configured to receive from the user a preference relating to the type of vehicle.

In an embodiment, the computer is configured to make a comparison between the recognition tag read and the reference tag and to generate a signal indicating whether the recognition tag read matches or does not match the reference tag.

In an embodiment, the computer is configured to generate an alert signal if the recognition tag read does not match the reference tag. The computer is thus configured to provide the user with a signal if the flexible panel roller assembly selected is not suitable for calibrating the sensor to be calibrated, in the vehicle located in the service area.

In an embodiment, the computer is connected to the interface to transmit to the interface the signal indicating whether the recognition tag read matches or does not match the reference tag (or the alert signal).

In an embodiment, the apparatus also comprises one or more non-flexible (i.e. rigid) target panels whose surface bears a respective combination of graphical features and which are connectable to the support structure. In an embodiment, the apparatus (or the calibration assistance structure) comprises a first plurality of flexible target panels (or flexible panel roller assemblies) bearing the most commonly used combinations of graphical features, and a second plurality of non-flexible (i.e. rigid) target panels bearing less commonly used combinations of graphical features.

In an embodiment, the calibration assistance structure includes a reflector having a metallic surface or a surface capable of reflecting electromagnetic waves at the frequencies at which radar sensors of ADAS systems work and configured to facilitate alignment or calibration of a radar ADAS sensor of the vehicle. In an embodiment, the reflector can be removably coupled to the support structure.

In an embodiment, the calibration assistance structure includes a device configured to calibrate or align an infrared ADAS sensor. In an embodiment, the device configured to calibrate or align the infrared ADAS sensor can be removably coupled to the support structure.

This disclosure also provides a flexible panel roller assembly. The flexible panel roller assembly comprises a roller. The flexible panel roller assembly comprises a flexible target panel. The flexible target panel defines a first surface (at least one). Represented on the first surface is a first combination of predetermined graphical features, configured to facilitate aligning or calibrating an ADAS sensor of a vehicle when the vehicle is positioned in such a way that the ADAS sensor faces towards the first surface (and the first surface is in an operating configuration). The flexible target panel is movable from a rolled-up configuration, in which it is wound round the roller, to an unrolled configuration, in which it is at least partly unwound from the roller, and vice versa. In the unrolled configuration, the flexible target panel is disposed with its first surface at the operating position. Thus, when the flexible target panel is at the operating position, the first surface is visible to the sensor of the vehicle.

The flexible target panel defines a second surface, opposite to (that is, on the back of) the first surface. In an embodiment, the second surface bears a second combination of graphical features, different from the first combination, to calibrate a further ADAS sensor (of a further vehicle).

This disclosure also provides a method for calibrating an ADAS sensor of an advanced driver assistance system of a vehicle. The vehicle is positioned in a service area.

In an embodiment, the method comprises a step of preparing a base unit.

In an embodiment, the method comprises a step of preparing (or providing) a support structure, connected to the base unit.

In an embodiment, the method comprises a step of providing a vehicle calibration assistance structure. The vehicle calibration assistance structure is connected to the support structure. In an embodiment, the vehicle calibration assistance structure is mounted on the support structure. The vehicle calibration assistance structure is configured to facilitate alignment or calibration of the ADAS sensor of the vehicle. The vehicle calibration assistance structure includes a first surface bearing a first combination of predetermined graphical features.

The method comprises a step of sending a calibration command to an electronic control unit of the vehicle.

The method comprises a step of viewing the first combination of predetermined graphical features through the vehicle sensor to be calibrated.

The method comprises a step of processing in a processing unit the data received from the electronic control unit of the vehicle.

In an embodiment, the method comprises a step of preparing (or providing) a flexible panel roller assembly including a roller and a flexible target panel. The flexible target panel defines the first surface.

In an embodiment, the step of preparing the flexible panel roller assembly includes connecting the flexible panel roller assembly to the support structure and/or to the vehicle calibration assistance structure.

In an embodiment, the step of preparing the flexible panel roller assembly includes hooking the flexible panel roller assembly to a quick release connecting system of the vehicle calibration assistance structure.

In an embodiment, the method comprises a step of unrolling the flexible target panel from a rolled-up configuration on the roller to an unrolled configuration. In the unrolled configuration, the flexible panel roller assembly disposes the first surface so it faces towards the service area and the vehicle sensor can view the combination of predetermined graphical features. It is observed that, preferably, the unrolling of the flexible target panel is subsequent to the connecting (or hooking) of the flexible panel roller assembly to the support structure and/or to the vehicle calibration assistance structure.

In an embodiment, unrolling is performed in a vertical direction (from the top down or from the bottom up).

In an embodiment in which the unrolling direction is vertical, the roller of the flexible panel roller assembly, when the flexible panel roller assembly is at the active position, is further away from the service area than the back panel. This configuration helps keep the flexible target panel tensioned when it is in the unrolled configuration.

The vertical unrolling direction has the advantage of allowing the horizontal position of the flexible target panel to be well controlled.

In an embodiment, unrolling is performed in a horizontal direction.

The horizontal unrolling direction has the advantage of affording a good level of flexibility in the management of target panels with different horizontal dimensions.

In an embodiment, the step of preparing the flexible panel roller assembly includes selecting the flexible panel roller assembly from a plurality of flexible panel roller assemblies as a function of the type of ADAS sensor and/or the type of vehicle.

In an embodiment, the ADAS sensor of the vehicle is a camera. For example, the ADAS sensor may be defined by a camera responsible for detecting a change of lane or a camera responsible for detecting the proximity of an object (for example, a pedestrian or another vehicle).

In an embodiment, the method comprises a step of reading, with a reader, a recognition tag associated with the flexible panel roller assembly.

In an embodiment, the method comprises a step of sending from the reader to a computer a signal representing the recognition tag read (or captured).

In an embodiment, the method comprises a step of querying a memory (or database) to retrieve from the memory a reference signal representing a reference tag. In an embodiment, the computer queries the database to retrieve the reference signal as a function of the type of ADAS sensor to be calibrated and/or of the type of vehicle.

In an embodiment, the method comprises a step of the computer receiving input data including the type of ADAS sensor to be calibrated and/or the type of vehicle.

In an embodiment, the method comprises a step of making a comparison between the recognition tag read and the reference tag. In an embodiment, the method comprises a step of generating a signal indicating whether the recognition tag read matches or does not match the reference tag.

These and other features will become more apparent from the following detailed description of a preferred, non-limiting embodiment, with reference to the accompanying drawings, in which.

With reference to the accompanying drawings, the numeral 1 denotes an apparatus for calibrating an ADAS sensor of a vehicle 9.

The vehicle 9 is positioned in a service area 8.

The apparatus 1 comprises a base unit 2. The base unit 2 includes a plurality of wheels 20. Preferably, the base unit 2 includes at least three wheels 20. In an embodiment, the base unit 2 includes at least four wheels 20.

The wheels 20 of the plurality rotate or are rotatable about respective axes of rotation. In an embodiment, the wheels 20 also swivel about respective swivel axes. The swivel axes are oriented (substantially) perpendicularly to the respective axes of rotation.

In an embodiment, the base unit comprises a stabilizer foot (at least one) which is movable between a raised position and a lowered position. The stabilizer foot may be moved by hand or through actuators controlled by the person or by the processing unit. When the structure is being moved, the foot is kept in the raised position; when the structure reaches a predetermined distance from a reference point, the foot is lowered so as to hold the base unit (or a point thereof) in place.

The stabilizer foot, at the lowered position, may serve as a pivot for rotating the structure.

In an embodiment, the base unit comprises two or more stabilizer feet. In an embodiment, the base unit comprises a stabilizer foot for each wheel.

The apparatus 1 comprises a support structure 3, mounted on the base unit 2.

The apparatus 1 comprises a vehicle calibration assistance structure 4.

The vehicle calibration assistance structure 4 is mounted on the support structure 3.

In an embodiment, the vehicle calibration assistance structure 4 includes a back panel 42.

In an embodiment, the vehicle calibration assistance structure 4 includes a reflector. The reflector is capable of reflecting electromagnetic waves for performing (or assisting in the performance of) calibration of a radar sensor of the vehicle 9. In an embodiment, the reflector can be moved (on a carriage) in a horizontal direction, at right angles to the vertical direction V.

In an embodiment, the vehicle calibration assistance structure 4 includes a carriage which is slidably coupled to the support structure 3. More specifically, the carriage is slidable in a vertical direction V to adjust the vehicle calibration assistance structure 4 in height relative to the support structure 3.

In an embodiment, the vehicle calibration assistance structure 4 is tiltable relative to the support structure 3 (about a vertical tilting axis), to vary the orientation of the vehicle calibration assistance structure 4 relative to the support structure 3.

In an embodiment, the support structure 3 is tiltable relative to the base unit 2 about a vertical tilting axis, to vary the vertical orientation of the support structure 3 relative to the base unit 2.

In an embodiment, the support structure 3 is tiltable relative to the base unit 2 about a horizontal tilting axis (at right angles to the vertical tilting axis), to vary the horizontal orientation of the support structure 3 relative to the base unit 2.

In an embodiment, the support structure 3 is tiltable relative to the base unit 2 about a longitudinal tilting axis (at right angles to the vertical tilting axis and to the horizontal tilting axis), to vary the longitudinal orientation of the support structure 3 relative to the base unit 2.

In an embodiment, the longitudinal tilting axis is parallel to an axis of symmetry or a thrust axis of the vehicle.

In an embodiment, the apparatus 1 comprises an optical projection system 6, which includes a laser emitter. The laser emitter is configured to project a laser blade or laser beam on the vehicle 9 which is positioned in the service area 8.

The support structure 3 can be driven manually by a person. In effect, the person pushes or pulls the support structure 3, which moves on the wheels 20.

Preferably, the support structure 3 includes a grippable portion 31, which is configured to allow (or make it easier for) the person to grip it with at least one hand. In an embodiment, the support structure 3 includes a first and a second grippable portion 31 configured to allow (or make it easier for) the person to grip it with a first and a second hand, respectively.

The apparatus 1 comprises a positioning system.

In an embodiment, the positioning system includes a first pair of heads 34, 34' associated with the support structure 3 (preferably at opposite ends of a horizontal bar 30 of the support structure 3, oriented perpendicularly to the vertical direction).

In an embodiment, the positioning system includes a second pair of heads 35, 35' associated with brackets which are connectable (or connected) to respective wheels (preferably the rear wheels) of the vehicle 9.

The heads 34, 34' associated with the support structure 3 each include a first emitter 34A, 34A', and a corresponding first receiver 340A, 340A', configured to detect the corresponding laser head 35, 35' associated with the wheel of the vehicle 9 (in order to detect the orientation of the support structure 3 relative to the thrust axis of the vehicle 9). The heads 34, 34' associated with the support structure 3 each include a second emitter 34B, 34B', and a corresponding second receiver 340B, 340B' directed at the other head 34, 34' of the first pair of heads, in order to view it.

Each head of the second pair of heads 35, 35', associated with the wheels, includes a first emitter 35A, 35A' and a corresponding first receiver 350A, 350A', directed towards the support structure 3 to view a corresponding head 34, 34' of the first pair of heads (or the emitter 34A, 34A' thereof). Each head of the second pair of heads 35, 35', associated with the wheels, includes a second emitter 35B, 35B' and a corresponding second receiver 350B, 350B', directed towards the other head 35, 35' of the second pair of heads in order to view it.

The first emitter 34A, 34A', the first receiver 340A, 340A', the second emitter 34B, 34B' and the second receiver 340B, 340B' of the first pair of heads 34, 34' are preferably mounted on arms which are directed in directions which make an angle of at least 90° with each other. The first emitter 35A, 35A', the first receiver 350A, 350A', the second emitter 35B, 35B' and the second receiver 350B, 350B' of the second pair of heads 35, 35' are preferably mounted on arms which are directed in directions which make an angle of 90° with each other.

For these emitters/receivers, various different technological solutions may be used: for example, CCD or laser or LED.

In an embodiment, the positioning system includes one or more distance meters 36 acting in conjunction with respective positioning target elements 37.

In an embodiment, there is one distance meter 36 operating in combination with the heads 34, 34'. For example, the distance meter 36 may be associated with the support structure 3 (preferably on the horizontal bar 30, at an intermediate position between the heads 34, 34') and the corresponding positioning target element 37 coupled to a (front) wheel of the vehicle 9 or connected to a stand which is operatively connected (rigidly) to the wheel rim; it should be noted that the positions of the distance meter 36 and of the positioning target element 37 may be reversed. The distance meter 36 is configured to view the positioning target element 37 to measure the distance of the support structure 3 from the vehicle 9.

In an embodiment, the positioning system includes a pair of distance meters 36, associated with the support structure 3 (preferably on the horizontal bar 30, at a position further in than the heads 34, 34') and a pair of positioning target elements 37, coupled to the front wheels of the vehicle 9. The distance meters 36 are configured to view the respective positioning target elements 37 to measure the distance of the support structure 3 from the vehicle 9.

In an embodiment, the distance meter 36 includes a laser emitter and a receiver; the distance meter 36 also includes a processor programmed to compare the signal emitted with the one received and, as a function of the comparison, to derive a distance between the distance meter itself and a surface at which the laser generated by the emitter is pointed (for example, the distance meter 36 might be configured to define a triangulator).

It should be noted that the (or each) positioning target element 37 which (or when it) cooperates with the distance meter, preferably includes a reflective surface to facilitate deriving the distance between the distance meter 36 itself and the positioning target element 37; in such a case, therefore, the positioning target element 37 preferably includes a reflective target element.

According to another aspect, the (or each) positioning target element 37 might include a graduated scale (or a surface on which one or more graduated scales are reproduced) configured to be lit by a laser beam that may be emitted by a plain laser pointer or by a distance meter 36. The function of the graduated scale is to facilitate relative positioning between the structure and the vehicle (for example, during a step of centring). In light of this, the positioning target element 37 preferably includes a graduated target element.

It should be noted that the reflective target elements and the graduated target elements may be distinct (that is, embodied by different panels) or, in an alternative embodiment, they may be combined in the same positioning target element 37; in effect, the positioning target element 37 might include two panels—one reflective and one graduated—or it might include one panel which is both reflective and graduated.

The heads 34, 34', 35, 35' and the distance meters 36 may be provided in combination with, or alternatively to, each other.

Figure 1:
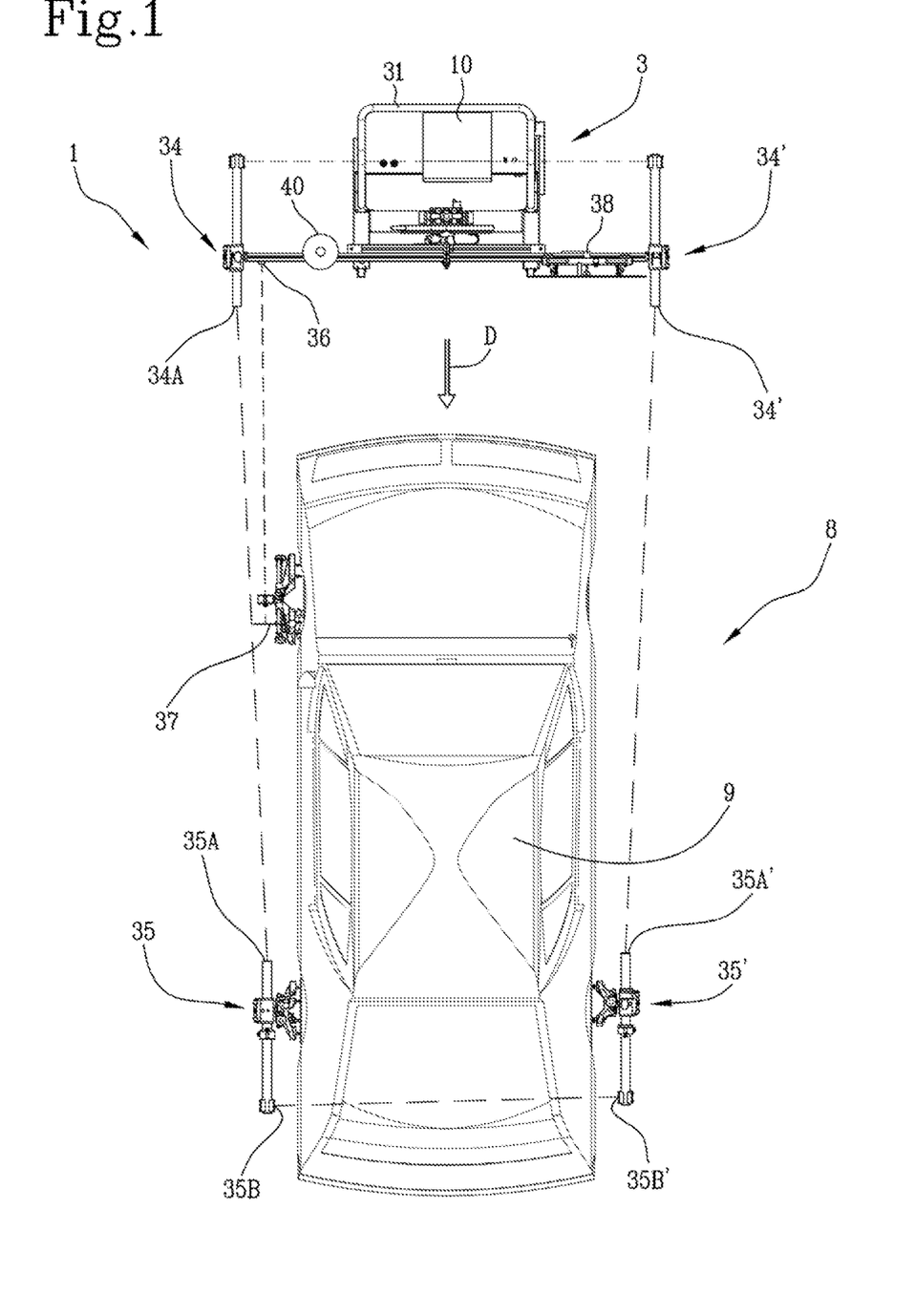
FIG. 1 is a top view showing an apparatus according to this disclosure for calibrating an ADAS sensor of a vehicle.
Figure 2A:
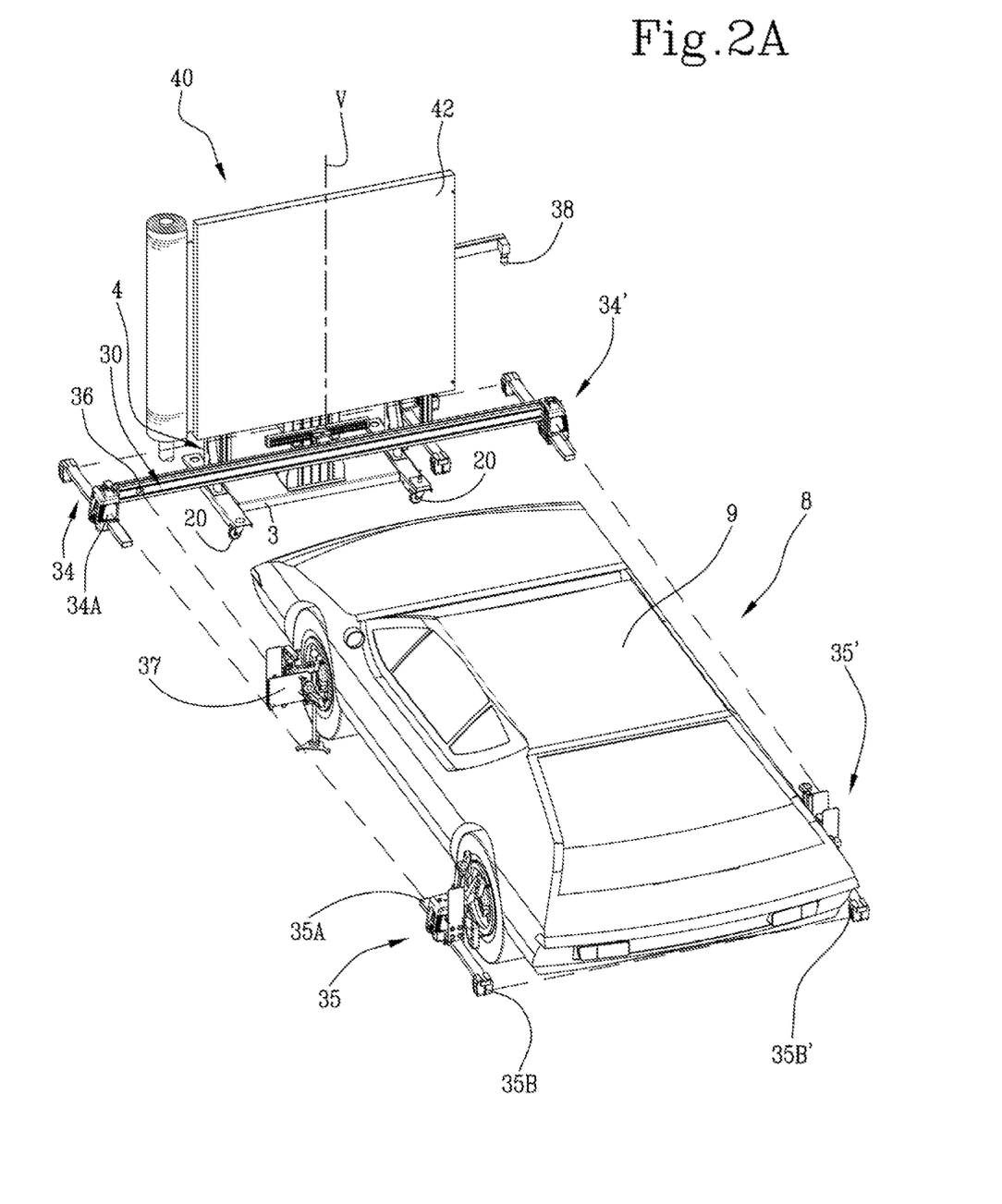
FIGS. 2A and 2B are perspective views showing an embodiment of the apparatus of FIG. 1, with a flexible panel roller assembly in the closed configuration and in the open configuration, respectively.
Figure 2B:
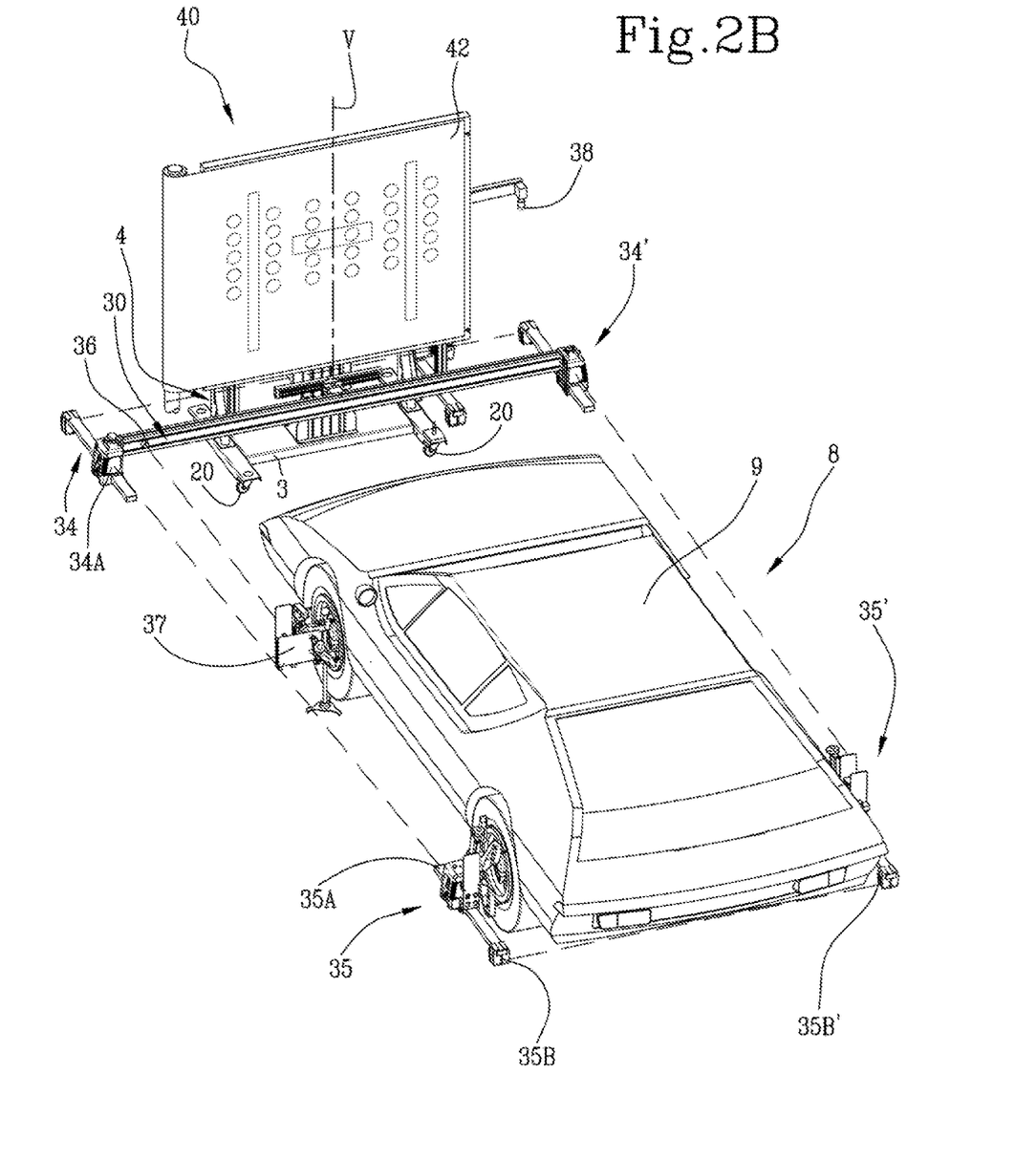
Figure 2C:
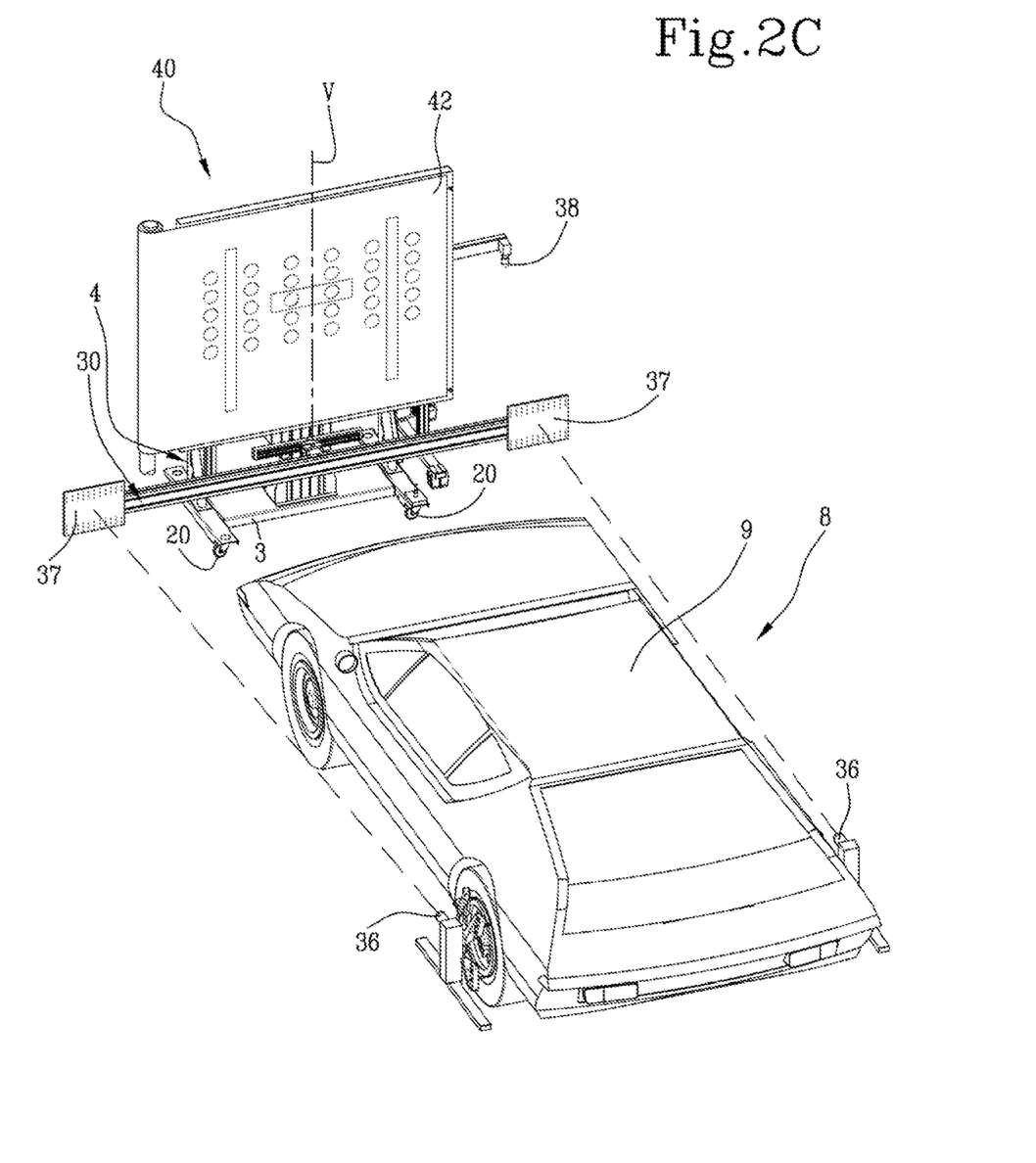
FIG. 2C shows another embodiment of the apparatus of FIG. 2A (with a plurality di distance meters)
Figure 3A:
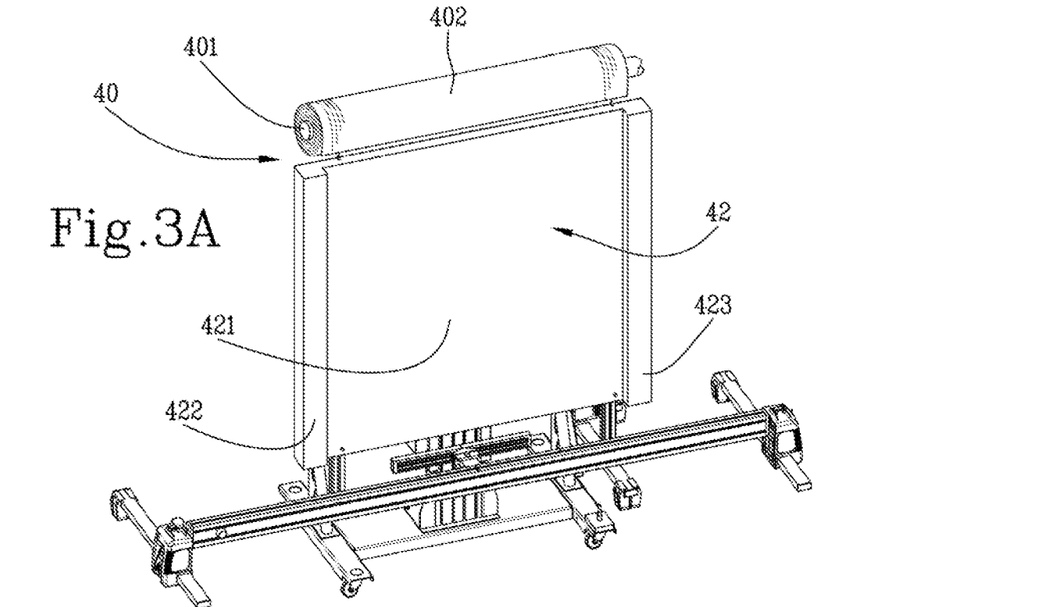
FIGS. 3A and 3B are perspective views showing a further embodiment of the apparatus of FIG. 1, with a flexible panel roller assembly in the closed configuration and in the open configuration, respectively.
Figure 3B:
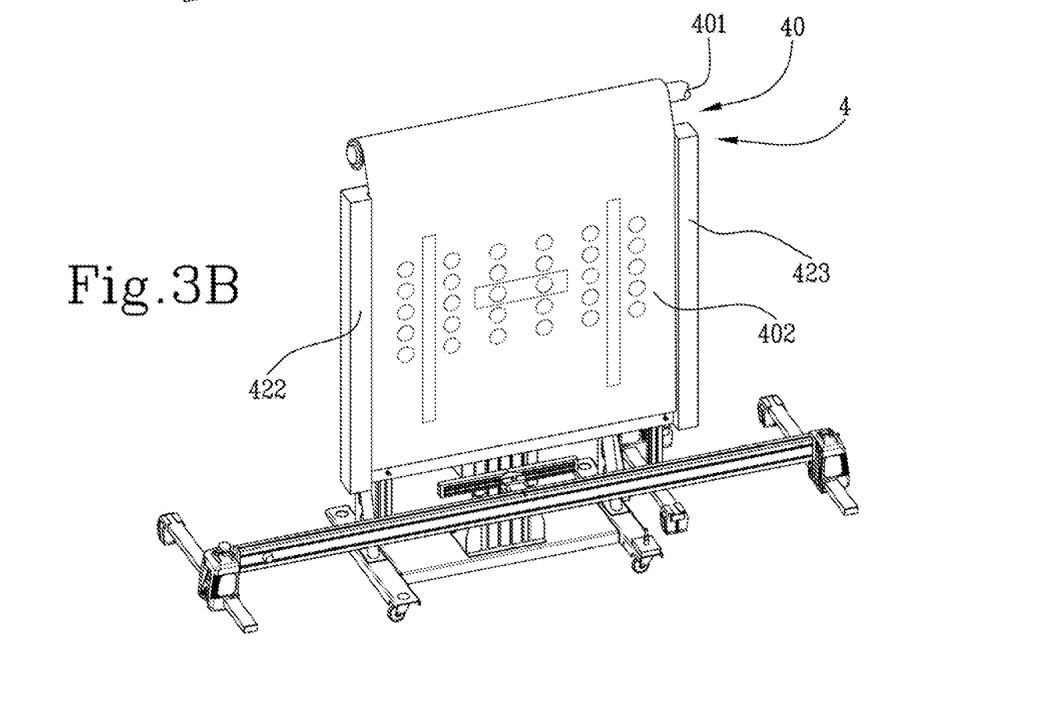
Figure 4A:
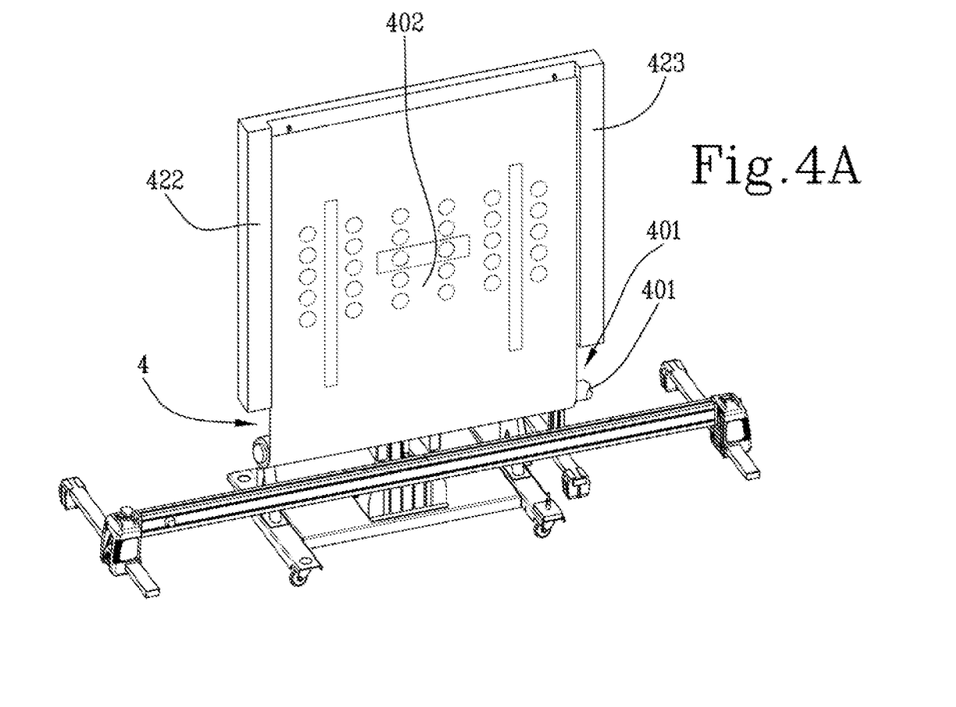
FIGS. 4A and 4B are perspective views showing a further embodiment of the apparatus of FIG. 1, with a flexible panel roller assembly in the closed configuration and in the open configuration, respectively.
Figure 4B:
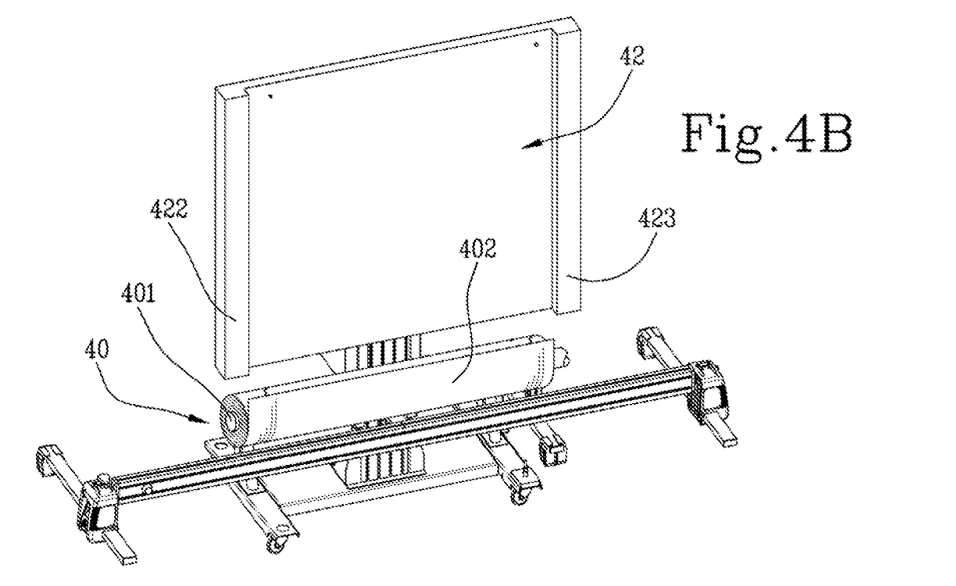

An embodiment is also imaginable in which the apparatus comprises a plurality of distance meters (and which might be without the heads 34, 34', 35, 35'). In an embodiment (an example of which is illustrated in FIG. 2C), the positioning system includes a pair of distance meters 36 which can be connected to the (front and/or rear) wheels of the vehicle through respective brackets for hooking onto the wheel rims; and a corresponding pair of positioning target elements 37 (removably) associated with the support structure. The distance meters are configured to view the respective positioning target elements to measure the distance of the distance meters themselves from the respective target elements (hence the distance of the vehicle from the support structure). The positioning target elements 37 are target panels, preferably provided with graduated scales.

In an embodiment, the heads 34, 34', 35, 35' and only one distance meter 36 are used; in effect, the heads 34, 34', 35, 35' measure the angular orientation of the support structure 3 and the distance meter 36 measures the distance of the support structure 3 relative to the vehicle 9 (more specifically, relative to the second reference parameter of the vehicle 9). In an embodiment, the heads 34, 34', 35, 35' are used to measure the angular orientation, and a camera (mounted on the support structure 3) is used to measure the distance of the support structure 3 from the vehicle 9.

In the embodiment where a pair of distance meters associated with the support structure are used to view the positioning target elements on the vehicle, or associated with the vehicle to view the positioning target elements on the support structure, the information regarding the distance derived from the distance meters might also optionally be used to derive information regarding the orientation; for example, if the distances measured by the two distance meters of the pair are congruent, it may be inferred that the structure is oriented perpendicularly to the thrust axis (or the axis of symmetry) of the vehicle.

In an embodiment, the distance meters 36 (each) include one or two laser emitters (pointers) which can be associated with the wheels (by means of brackets) and which are configured to point a laser beam at a graduated scale associated with the support structure 3 through the positioning target element 37. The emitters (or pointers) can be used to centre the support structure 3 relative to the vehicle 9.

In an embodiment, the positioning target elements 37 include reflective surfaces (for example, mirrors).

In an embodiment, each laser emitter (be it a plain laser emitter or, preferably, a distance meter 36) is associated with a corresponding positioning target element 37 with a graduated scale. In this case, the distance meter 36 (or a laser pointer) and the positioning target element 37 with a graduated scale are mounted on the same part—for example on the same assembly—which is (removably) connectable to the wheel or to the structure; in this embodiment, a reflective target element is associated with the structure or with the wheel, respectively, but always on the opposite side relative to the distance meter 36 (or laser pointer) to reflect the beam generated by the distance meter 36 and direct it at the graduated target element.

In an embodiment, the distance meters 36 are laser distance meters. In an embodiment, the laser emitters (pointers) are the emitters of the distance meters 36. Using the distance meters 36 (even in combination with the graduated target elements) allows the positioning system to be centred, oriented and positioned at the correct distance relative to the vehicle 9.

In an embodiment, the positioning system includes a height distance meter 38 mounted on the vehicle calibration assistance structure 4 and directed towards the floor the base unit 2 rests on in order to measure the height of the vehicle calibration assistance structure 4 relative to the floor (hence relative to the support structure 3, whose height from the floor is fixed). The height distance meter 38 is particularly useful in the case where the vehicle calibration assistance structure 4 is slidable along the support structure 3 in the vertical direction (on the carriage).

In an embodiment not illustrated in the drawings, the positioning system includes a positioning target element of the support structure, connected to the support structure 3. In an embodiment, the positioning system includes a positioning device which is spaced from the support structure.

In an embodiment, the positioning device is movable on a respective trolley. In an embodiment, the positioning device is movable on respective rails. The positioning device includes an optical device, oriented in a lateral direction to see graphical features of the vehicle (preferably on one of the vehicle's wheels). The optical device of the positioning device preferably includes a first camera and a second camera, in a stereo configuration. The positioning device is positioned at a front axle of the vehicle (if it is to view graphical features of the front wheel) or at a rear axle of the vehicle (if it is to view graphical features of the rear wheel). The positioning device includes a matching camera, oriented towards the positioning target element of the support structure (that is, oriented in a backward direction, opposite to the forward direction).

In an embodiment, the apparatus 1 (or the vehicle calibration assistance structure 4) includes a flexible panel roller assembly 40. When in an active position, the flexible panel roller assembly 40 is connected to the support structure 3.

The flexible panel roller assembly 40 includes a roller 401. The flexible panel roller assembly 40 includes a flexible target panel 402 The flexible target panel 402 has a first surface bearing a first combination of predetermined graphical features. The flexible target panel 402 is movable between a rolled-up configuration, in which it is wound round the roller 401, and an unrolled configuration, in which it is unwound from the roller 401. When the flexible panel roller assembly 40 is in the active position (where it is connected to the support structure 3) and the flexible target panel 402 is in the unrolled configuration, the first surface faces towards the service area 8 in a forward direction D, in such a way that the ADAS sensor of the vehicle 9 can view the first combination of graphical features.

In an embodiment, the apparatus 1 (or the vehicle calibration assistance structure 4) includes a plurality of flexible panel roller assemblies 40. Each flexible panel roller assembly 40 includes a respective roller 401 and a respective flexible target panel 402. The flexible panel roller assemblies 40 of the plurality of flexible panel roller assemblies 40 are interchangeably connectable to the support structure 3, one in place of another.

Figure 5:
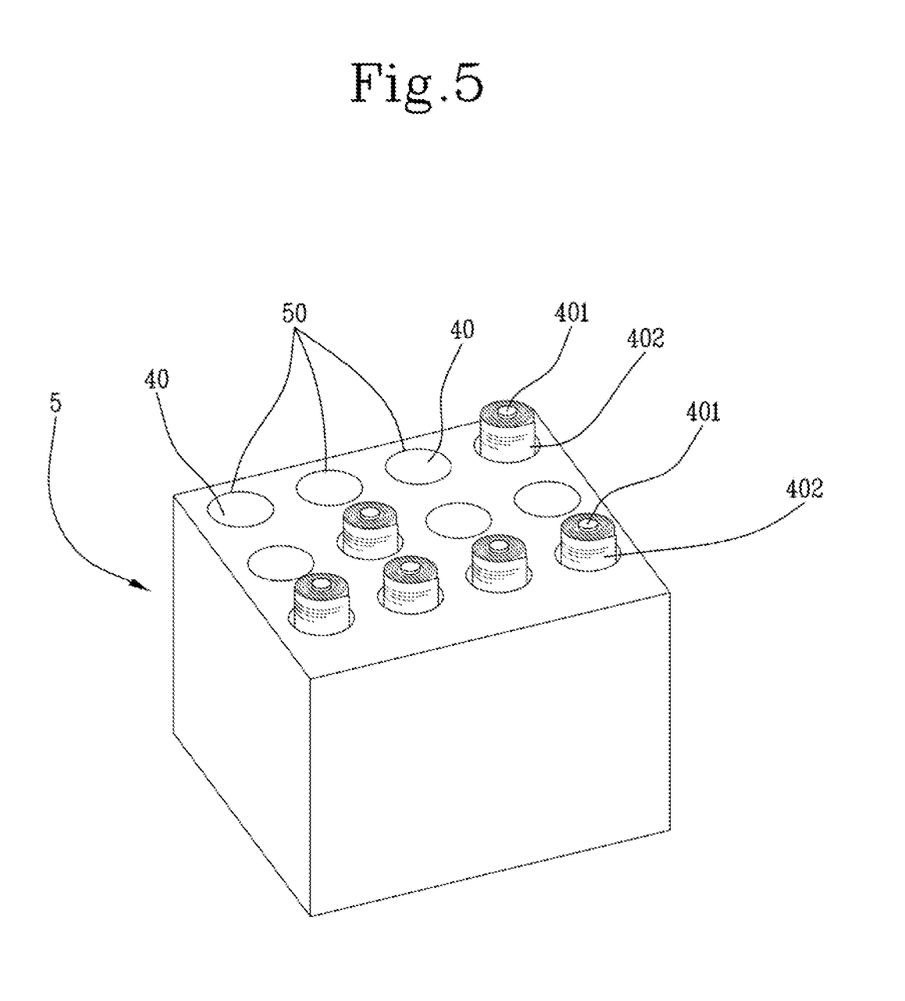
FIG. 5 shows a container and a plurality of flexible panel roller assemblies housed therein, in the deactivated position.

In an embodiment, the apparatus 1 includes a container 5. The container 5 has a plurality of housings 50 defined in it. The housings 50 are configured to accommodate corresponding flexible panel roller assemblies 40 of the plurality of flexible panel roller assemblies 40 in a deactivated position (that is, a rest position). In the deactivated position, the flexible target panel 402 is wound round the roller 401. Thus, the flexible panel roller assembly 40 is said to be in an active position when it is connected to the support structure 3 and the flexible panel roller assemblies 40 positioned in the container 5 are said to be in a deactivated position.

In an embodiment, the vehicle calibration assistance structure 4 includes a back panel 42. The back panel 42 is preferably connected to the support structure 3. In an embodiment, the back panel 42 has a back surface 421 which faces towards the service area 8 and which the flexible target panel 402 is placed in contact with when in the unrolled configuration. More specifically, in the unrolled configuration, when the first surface of the flexible target panel 402 faces towards the service area 8, the second surface of the flexible target panel 402 is in contact with the back surface 421.

In an embodiment, the calibration assistance structure 4 includes one or more locking devices configured to keep the target panel in the unrolled configuration. In an embodiment, the one or more locking devices include at least one locking board which is movable (rotatable) between an open position and a closed position. At the open position, the at least one locking board is lifted off the back surface; at the closed position, the at least one locking board is superposed on the back surface to cover a margin of the flexible target panel and hold it in place. The at least one locking board may include a locking board positioned on one side of the back panel opposite to the flexible panel roller assembly and/or lateral boards positioned on opposite sides of the back surface, at right angles to the roller.

In an embodiment, the back panel 42 includes a pair of lateral guides 422, 423 projected in the forward direction D towards the service area 8, relative to the back surface 42.

In an embodiment, the lateral guides 422, 423 extend along the vertical direction V, to allow unrolling the flexible target panel 402 in the vertical direction, between the two lateral guides 422, 423.

In an embodiment, the lateral guides 422, 423 extend along the horizontal direction, to allow unrolling the flexible target panel 402 in the horizontal direction, between the two lateral guides 422, 423.

This disclosure also relates to a method for calibrating an ADAS sensor of an advanced driver assistance system of a vehicle 9. In particular, in an embodiment, the ADAS sensor is a camera.

The vehicle 9 is positioned in a service area 8.

The method comprises a step of preparing a base unit 2.

The method comprises a step of preparing a support structure 3, connected to the base unit 2. The method comprises a step of preparing a vehicle calibration assistance structure 4 mounted on the support structure 3. The vehicle calibration assistance structure 4 is configured to facilitate alignment or calibration of the ADAS sensor of the vehicle. The vehicle calibration assistance structure 4 includes a first surface bearing a first combination of predetermined graphical features.

The method comprises a step of positioning the support structure 3 in proximity to the service area 8 in such a way that the sensor of the vehicle 9 can view the first surface.

The step of positioning comprises a sub-step of positioning the support structure 3 at a predetermined distance from the vehicle 9. In an embodiment, the distance between the support structure 3 and the vehicle 9 is measured by a distance meter 36 or, preferably, a pair of distance meters 36 (preferably laser sensors) configured to view a respective positioning target element 37, or a respective pair of positioning target elements 37. In an embodiment, the distance meter or the distance meters 36 are associated with the support structure and the positioning target element or elements 37 are associated with the vehicle 9 (preferably, on brackets connected to the front or rear wheels). In another embodiment, the distance meter or the distance meters 36 are associated with the vehicle 9 (preferably, on brackets connected to the front or rear wheels) and the positioning target element or elements 37 are associated with the support structure 3.

The step of positioning comprises a sub-step of centring the support structure 3 relative to the vehicle 9. In an embodiment, centring is carried out by a laser emitter (or pointer) which can be associated with the vehicle 9 (preferably, on brackets associated with a front or rear wheel) configured to point a laser beam at a graduated scale associated with the support structure 3; the structure is moved until the emitter (or pointer) points to a predetermined point (for example the midpoint) of the graduated scale.

In an alternative embodiment, the graduated scale, that is, the graduated target element, is associated with the wheel.

The step of positioning comprises a sub-step of positioning the support structure 3 (or the vehicle calibration assistance structure 4) at a predetermined orientation relative to the vehicle 9. In an embodiment, the orientation is measured by a pair of laser emitters (or pointers) associated with the vehicle 9 (preferably, on brackets associated with a front or rear wheel) configured to point a laser beam at a mirror associated with the support structure 3 (or with the calibration assistance structure 4). In another embodiment, the orientation is derived as a function of the distance data measured by the distance meters 36.

The step of positioning comprises a sub-step of positioning the vehicle calibration assistance structure 4 at a predetermined height relative to the vehicle 9. In an embodiment, the height is measured by reading it off a graduated scale which is associated with the support structure 3 and along which the calibration assistance structure 4 is slidable. In an embodiment, the height is measured by a height distance meter 38.

The method comprises a step of preparing a flexible panel roller assembly 40 including a roller 401 and a flexible target panel 402. The flexible target panel 402 defines the first surface. In an embodiment, the flexible panel roller assembly 40 forms an integral part of the vehicle calibration assistance structure 4.

In an embodiment, the step of preparing the flexible panel roller assembly 40 comprises a step of selecting the flexible panel roller assembly 40 from a plurality of flexible panel roller assemblies 40. In an embodiment, the method comprises a step of extracting the selected flexible panel roller assembly 40 from a container 5 containing the plurality of flexible panel roller assemblies 40.

In an embodiment, the method comprises a step of connecting (or hooking up) the (selected) flexible panel roller assembly 40 to the vehicle calibration assistance structure 4 (or to the support structure 3).

The method comprises a step of unrolling the flexible target panel 402 from a rolled-up configuration where it is wound round the roller 401 to an unrolled configuration, in which the first surface is disposed so it faces towards the service area 8 and the ADAS sensor of the vehicle 9 can view the combination of predetermined graphical features.

In an embodiment, the method comprises a step of locking the flexible target panel 402 in the unrolled configuration by means of one or more locking devices.

The method comprises the steps of: sending a calibration command to an electronic control unit of the vehicle 9; detecting the calibration device through the sensor of the vehicle 9 to be calibrated; processing data received from the electronic control unit of the vehicle 9.

In an embodiment, after the steps of sending the calibration command to the electronic control unit of the vehicle, viewing the first combination of graphical features through the sensor of the vehicle 9 to be calibrated and processing data received from the electronic control unit in the processing unit, the method comprises a step of rolling up the flexible target panel 402 from the unrolled configuration to the rolled-up configuration. In an embodiment, the method next comprises a step of removing the flexible panel roller assembly 40 from the active position. The step of removing the flexible panel roller assembly 40 from the active position may include unhooking the flexible panel roller assembly from a quick release connecting system of the vehicle calibration assistance structure 4. In an embodiment, the method next comprises a step of positioning the flexible panel roller assembly 40 in a deactivated position inside a housing 50 of the container 5.

The invention claimed is:

1. An apparatus for calibrating an Advanced Driver Assistance System, ADAS, sensor of an advanced driver assistance system of a vehicle positioned in a service area, comprising:
a base unit;
a support structure connected to the base unit;
a vehicle calibration assistance structure, configured to facilitate aligning or calibrating the Advanced Driver Assistance System, ADAS, sensor of the vehicle, wherein the vehicle calibration assistance structure includes a first surface having predetermined graphical features, the first surface is connected with the support structure so that the first surface, at an operating position, faces towards the service area,
wherein the vehicle calibration assistance structure comprises a flexible panel roller assembly operatively connected to the support structure, the flexible panel roller assembly including a roller and a flexible target panel, wherein the flexible target panel defines the first surface, the flexible target roller is movable from a rolled-up configuration, where the flexible target panel is wound round the roller, to an unrolled configuration, where the flexible target panel is at least partly unwound from the roller to dispose the first surface at the operating position.

2. The apparatus according to claim 1, wherein the vehicle calibration assistance structure includes a quick release connecting system configured to receive the flexible panel roller assembly in an active position, where the flexible panel roller assembly is movable between the rolled-up configuration and the unrolled configuration.

3. The apparatus according to claim 1, comprising a container including a plurality of housings, wherein each housing of the plurality of housings is configured to accommodate a corresponding flexible panel roller assembly in a deactivated position where the flexible target panel is in the rolled-up configuration.

4. The apparatus according to claim 1, comprising a plurality of flexible panel roller assemblies, each of the flexible panel roller assemblies including a respective roller and a respective flexible target panel having a respective combination of predetermined graphical features, wherein each of the flexible panel roller assemblies of the plurality of flexible panel roller assemblies are interchangeably and removably connectable to the support structure, one in place of another.

5. The apparatus according to claim 1, wherein the flexible target panel includes a layer of opaque material defining the first surface.

6. The apparatus according to claim 1, wherein the flexible target panel defines a second surface opposite to the first surface, the second surface having a second combination of predetermined graphical features, wherein the flexible panel roller assembly is connectable to the support structure so that when the second surface is at a respective operating position, the second surface faces towards the service area.

7. The apparatus according to claim 1, wherein the vehicle calibration assistance structure includes a back panel, the back panel is connected to the support structure, the back panel having a back surface facing towards the service area and configured to supportably receive the flexible target panel in the unrolled configuration.

8. The apparatus according to claim 7, wherein the back panel includes a pair of lateral guides projected in a forward direction towards the service area, relative to the back surface, and extending lengthwise in parallel with each other on opposite sides of the back surface, wherein the flexible target panel, in the unrolled configuration, is positioned between the lateral guides of the pair of lateral guides.

9. The apparatus according to claim 7, wherein the surface of the back panel is metallic, and wherein the vehicle calibration assistance structure includes at least one magnetic cover sheet, configured to be placed at an active position where the at least one magnetic cover sheet is magnetically held against the back panel and is superposed on the first surface of the flexible target panel when the flexible target panel is in the unrolled configuration, so as to cover a portion of the first combination of predetermined graphical features.

10. The apparatus according to claim 1, wherein the flexible target panel is movable from the rolled-up configuration to the unrolled configuration, and vice versa, along a vertical unrolling direction parallel to the weight force.

11. The apparatus according to claim 1, wherein the flexible target panel is movable from the rolled-up configuration to the unrolled configuration, and vice versa, along a horizontal unrolling direction at right angles to the weight force.

12. The apparatus according to claim 1, wherein the flexible target panel includes a flexible screen, configured to display the first combination of predetermined graphical features.

13. The apparatus according to claim 1, wherein the flexible panel roller assembly includes a recognition tag and wherein the apparatus further includes:
a reader, configured to read the recognition tag;
a computer, connected to the reader to receive from the reader a signal representing the recognition tag read and having access to a memory to retrieve from the memory a reference signal, representing a reference tag, wherein the computer is configured to make a comparison between the recognition tag read and the reference tag and to generate a signal indicating whether the recognition tag read matches or does not match the reference tag.

14. A flexible panel roller assembly, comprising:
a roller including a connecting zone, configured to act in conjunction with a quick release connecting system of a vehicle calibration assistance structure;
a flexible target panel coupled to the roller, wherein the flexible target panel defines a first surface, having a first combination of predetermined graphical features, configured to facilitate aligning or calibrating an Advanced Driver Assistance System, ADAS, sensor of a vehicle when the vehicle, where the Advanced Driver Assistance System, ADAS, sensor faces towards the first surface at an operating position, and
wherein the flexible target panel is movable from a rolled-up configuration, where the flexible target panel is wound round the roller, to an unrolled configuration, where the flexible target panel is at least partly unwound from the roller to dispose the first surface at the operating position.

15. The flexible target panel of claim 14, defining a second surface, opposite to the first surface, wherein the second surface bears a second combination of graphical features, different from the first combination, to calibrate a further Advanced Driver Assistance System, ADAS, sensor.

16. A method for calibrating an Advanced Driver Assistance System, ADAS, sensor of an advanced driver assistance system of a vehicle, wherein the vehicle is positioned in a service area, the method comprising the following steps:
providing a base unit;
providing a support structure connected to the base unit;
providing a vehicle calibration assistance structure, connected to the support structure, configured to facilitate aligning or calibrating the Advanced Driver Assistance System, ADAS, sensor of the vehicle, and including a first surface, the first surface having a first combination of predetermined graphical features;
sending a calibration command to an electronic control unit of the vehicle;
viewing the first combination of predetermined graphical features of the vehicle through the Advanced Driver Assistance System, ADAS, sensor to be calibrated;
processing in a processing unit data received from the electronic control unit of the vehicle;
wherein the method further comprises the following steps:
providing a flexible panel roller assembly including a roller and a flexible target panel, wherein the flexible target panel defines the first surface;
unrolling the flexible target panel from a rolled-up configuration, where the flexible target panel is wound round the roller to an unrolled configuration, where the first surface is disposed so it faces towards the service area and the Advanced Driver Assistance System, ADAS, sensor of the vehicle can view the combination of predetermined graphical features.

17. The method according to claim 16, wherein the step of preparing the flexible panel roller assembly includes selecting the flexible panel roller assembly from a plurality of flexible panel roller assemblies as a function of the type of vehicle.

18. The method according to claim 16, wherein the Advanced Driver Assistance System, ADAS, sensor of the vehicle is a camera.

19. The method according to claim 16, comprising a step of reading, with a reader, a recognition tag associated with the flexible panel roller assembly.

20. The method according to claim 16, wherein the step of providing the flexible panel roller assembly includes hooking the flexible panel roller assembly to a quick release connecting system of the vehicle calibration assistance structure and/or of the support structure.

* * * * *

UNITED STATES PATENT AND TRADEMARK OFFICE
CERTIFICATE OF CORRECTION

| | | |
|---|---|---|
| PATENT NO. | : 11,676,304 B2 | Page 1 of 1 |
| APPLICATION NO. | : 16/799260 | |
| DATED | : June 13, 2023 | |
| INVENTOR(S) | : Giulio Corghi | |

It is certified that error appears in the above-identified patent and that said Letters Patent is hereby corrected as shown below:

On the Title Page

Item (30) Insert:
--Feb. 25, 2019 (IT).........102019000002703--

Signed and Sealed this
Twenty-second Day of August, 2023

Katherine Kelly Vidal
*Director of the United States Patent and Trademark Office*